United States Patent
Sullivan

(10) Patent No.: US 7,365,128 B2
(45) Date of Patent: Apr. 29, 2008

(54) HIGHLY-NEUTRALIZED ACID POLYMERS AND THEIR USE IN GOLF BALLS

(75) Inventor: Michael J. Sullivan, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 289 days.

(21) Appl. No.: 11/216,726

(22) Filed: Aug. 31, 2005

(65) Prior Publication Data

US 2007/0049673 A1    Mar. 1, 2007

(51) Int. Cl.
- A63B 37/00 (2006.01)
- A63B 37/06 (2006.01)
- A63B 37/12 (2006.01)
- C08L 33/02 (2006.01)

(52) U.S. Cl. ............... 525/187; 524/376; 524/377; 524/378; 473/371; 473/372; 473/373; 473/377

(58) Field of Classification Search ............. None
See application file for complete search history.

(56) References Cited

U.S. PATENT DOCUMENTS

| | | | |
|---|---|---|---|
| 3,361,702 A * | 1/1968 | Wartman et al. | 524/377 |
| 6,653,382 B1 | 11/2003 | Statz et al. | |
| 6,756,436 B2 | 6/2004 | Rajagopalan et al. | |
| 2002/0115497 A1 | 8/2002 | Boll | |
| 2003/0013549 A1 * | 1/2003 | Rajagopalan et al. | 473/354 |
| 2003/0050373 A1 | 3/2003 | Chen | |
| 2003/0114565 A1 | 6/2003 | Chen et al. | |
| 2003/0130434 A1 | 7/2003 | Statz et al. | |
| 2003/0224873 A1 | 12/2003 | Ichikawa et al. | |
| 2003/0225197 A1 | 12/2003 | Rajagopalan et al. | |
| 2004/0106736 A1 * | 6/2004 | Takesue et al. | 525/196 |

* cited by examiner

Primary Examiner—David J. Buttner
(74) Attorney, Agent, or Firm—Mandi B. Milbank

(57) ABSTRACT

The present invention is directed to a golf ball having at least one layer which includes a polymer composition containing at least 50 wt % of an acid polymer and at least 0.5 wt % of a polyhydric alcohol, wherein the weight percentages are based on the total polymeric weight of the polymer composition. At least 70% of the acid groups of the acid polymer are neutralized by a cation source or a metal salt thereof.

10 Claims, No Drawings

HIGHLY-NEUTRALIZED ACID POLYMERS AND THEIR USE IN GOLF BALLS

FIELD OF THE INVENTION

The present invention is directed to polymer compositions including one or more highly-neutralized polymers and one or more polyhydric alcohols, and to the use of such compositions in golf balls.

BACKGROUND OF THE INVENTION

Conventional golf balls can be divided into two general classes: solid and wound. Solid golf balls include one-piece, two-piece (i.e., solid core and a cover), and multi-layer (i.e., solid core of one or more layers and/or a cover of one or more layers) golf balls. Wound golf balls typically include a solid, hollow, or fluid-filled center, surrounded by a tensioned elastomeric material, and a cover.

Golf ball core and cover layers are typically constructed with polymer compositions including, for example, polybutadiene rubber, polyurethanes, polyamides, ionomers, and blends thereof. Ionomers, particularly ethylene-based ionomers, are a preferred group of polymers for golf ball layers because of their toughness, durability, and wide range of hardness values. Ionomers are stiffened by increasing the amount of neutralization. Neutralization to 70% and higher, including 100%, has been disclosed. However, in the absence of flow additives, at neutralization levels above about 60%, the melt flow of the ionomer is decreased to an extent such that processability decreases or disappears altogether. For trivalent cations, the percent neutralization at which the polymer becomes unprocessable, in the absence of flow additives, can be significantly lower.

Blending ionomers with fatty acids is a known method for improving the processability of highly neutralized polymers. For example, U.S. Pat. No. 6,653,382 discloses melt-processable, highly-neutralized ethylene acid copolymers and a process for making them by incorporating an aliphatic, mono-functional organic acid in the acid copolymer and then neutralizing greater than 90% of all of the acid groups present.

The use of polyhydric alcohols in golf ball compositions is known. For example, U.S. Patent Application Publication No. 2003/0224873 discloses an ionomer resin used in admixture with a compound containing at least two reactive functional groups, e.g., hydroxyl groups, and having a molecular weight of up to 20,000. The reference proposes the admixing of such compound to improve the adhesion of one cover layer formed primarily of the ionomer resin to another cover layer disposed contiguous thereto. The reference does not disclose highly neutralized polymers.

Another reference which discloses the use of polyhydric alcohols in golf ball compositions is U.S. Patent Application Publication No. 2003/0225197, which discloses a process for forming a golf ball having at least one layer, wherein the layer is formed of a polymer blend including a highly neutralized polymer formed from an oxa acid, a thermoplastic resin, and an inorganic metal compound, an organic amine, or a combination thereof, wherein greater than about 70% of the acid groups in the polymer blend are neutralized. The reference discloses polyethylene glycol as an additional component in saponified polymer/oxa ester blends for use in golf ball covers.

A desire remains for novel compositions containing a highly neutralized acid polymer ("HNP"), which are useful in golf ball applications, and which are processable without the need for fatty acids or their salts. The present invention describes such compositions and their use in a variety of golf ball core and cover layers.

SUMMARY OF THE INVENTION

In one embodiment, the present invention is directed to a golf ball having at least one layer formed from a polymer composition, the polymer composition comprising at least 50 wt %, based on the total polymeric weight of the polymer composition, of an acid polymer having acid groups; and at least 0.5 wt %, based on the total polymeric weight of the polymer composition, of a polyhydric alcohol. At least 70% of the acid groups of the acid polymer are neutralized.

In another embodiment, the present invention is directed to a golf ball having at least one layer formed from a polymer composition, the polymer composition having a melt flow index of from 1.0 g/10 min to 5.0 g/10 min and consisting essentially of at least 50 wt %, based on the total polymeric weight of the polymer composition, of an acid polymer having acid groups; at least 0.5 wt %, based on the total polymeric weight of the polymer composition, of a polyhydric alcohol; and from 0 wt % to 60 wt %, based on the total weight of the polymer composition, of an inorganic additive. At least 70% of the acid groups of the acid polymer are neutralized.

DETAILED DESCRIPTION OF THE INVENTION

Golf balls of the present invention include one-piece, two-piece, multi-layer, and wound golf balls having a variety of core structures, intermediate layers, covers, and coatings. Golf ball cores may consist of a single, unitary layer, comprising the entire core from the center of the core to its outer periphery, or they may consist of a center surrounded by at least one outer core layer. The center, innermost portion of the core is preferably solid, but may be hollow or liquid-, gel-, or gas-filled. The outer core layer may be solid, or it may be a wound layer formed of a tensioned elastomeric material. Golf ball covers may also contain one or more layers, such as a double cover having an inner and outer cover layer. Optionally, additional layers may be disposed between the core and cover. In the golf balls of the present invention, at least one layer comprises an HNP-containing composition described herein. Preferably, the HNP-containing composition is included as an intermediate layer, preferably an outer core layer or inner cover layer, of a multi-layer golf ball.

The HNP-containing compositions of the present invention include one or more highly neutralized acid polymer(s) and one or more polyhydric alcohol(s). By the present invention, it has been found that by adding a sufficient amount of a polyhydric alcohol to compositions containing an acid polymer, the acid groups of the acid polymer can be neutralized at high levels, including up to 100%, without requiring a fatty acid to maintain processability.

The HNP-containing compositions may contain fatty acids and salts thereof, but are processable without them. Fatty acids include, for example, caproic acid, caprylic acid, capric acid, lauric acid, stearic acid, behenic acid, erucic acid, oleic acid, and linoleic acid. Preferably, the HNP-containing composition is substantially free of fatty acids and their salts. However, fatty acids and salts thereof may be used in the HNP-containing composition without departing from the spirit of the invention. "Substantially free," as used herein, means that the composition does not contain fatty acids or their salts, or includes fatty acids or their salts in an amount of less than 0.5 wt %, based on the total polymeric weight of the composition.

In order to be processable, the HNP-containing composition has a melt flow index of at least 0.5 g/10 min. Preferably, the melt flow index of the HNP-containing composition is from 0.5 g/10 min to 10.0 g/10 min, more preferably from 1.0 g/10 min to 5.0 g/10 min, and even more preferably from 1.0 g/10 min to 4.0 g/10 min.

Examples of suitable polyhydric alcohols include, but are not limited to, polyalkylene glycols, particularly polyethylene glycol and polypropylene glycol; polylactic acid; copolymers thereof; and blends thereof. Polyhydric alcohols of the present invention generally have a weight average molecular weight ($M_w$) of greater than 500, preferably from 500 to 20,000, and more preferably from 1,000 to 20,000. Preferably, the polyhydric alcohol is polyethylene glycol or a copolymer thereof, including multi-armed polyethylene glycol polymers, such as those disclosed in U.S. Pat. No. 6,371,975, the entire disclosure of which is hereby incorporated herein by reference. Particularly preferred multi-armed polyethylene glycols are those modified with glutaric acid and hydroxysuccinimide ester groups, resulting in a 4-arm polyethylene glycol succinimidyl glutarate having an $M_w$ of about 10,000. Such 4-arm polyethylene glycols are commercially available from Shearwater Polymers of Huntsville, Ala.

While not wishing to be bound by theory, it is believed that polyhydric alcohols function as ionic plasticizers, which plasticize the ionic regions or domains of the polymer without plasticizing the non-ionic polymer backbone. They may also function as amphiphilic plasticizers, plasticizing both the ionic and non-ionic (i.e., olefinic) regions of the ionomer. Other suitable plasticizers include, but are not limited to, alkylamines (e.g., methylamine, ethylamine, propylamine, butylamine, hexylamine, octylamine, dimethylamine, trimethylamine, triethylamine, methylethylamine, methyl-n-butylamine, tetramethylethylene diamine, cyclohexylamine, and longer chain alkylamines, such as dimethylstearylamine); alkanol amines (e.g., dimethylethanol amine, diethylethanol amine, dipropylethanol amine, and dibutylethanol amine); fatty acid amines (e.g., bissstearamides and alkylene bis-fatty acid amides, such as ethylene bisstearamide); glycerol and glycerol esters (e.g., glycerol acetate and glycerol monostearate); butanediol; hexamethyl phosphoramide; N-ethyl toluene sulfonamide; N,N-dimethylacetamide; 2,2-dimethyl-1,2-ethanediol; and dimethyl sulfoxide. One or more of the following materials may also be used instead of, or in addition to, polyhydric alcohol(s) in compositions of the present invention: phthalate esters and modified phthalate esters (e.g., dioctyl phthalate and dibutyl phthalate); phthalates of linear alcohols; citrates (e.g., tributyl citrate and acetyl tributyl citrate); monoesters and diesters of polyoxyethylene alkyl ethers; polyoxyethylene alkylaryl ethers; polyoxyethylene alkylene ester sulfates; polyoxyethylene alkyl phenol ether sulfates; and polyoxyethylene sorbitan fatty acid esters (e.g., polyoxyethylene sorbitan monolaurate).

The HNP-containing compositions of the present invention may also contain a melt flow modifier selected from polyesters, polyacrylates, thermoplastic polyureas, polyethers, polyamides, and combinations thereof. Such nonfatty acid melt flow modifiers typically have an $M_w$ of from 1,000 to 100,000 and a melt flow index of from 10 g/10 min to 1,000 g/110 min.

The amount of polyhydric alcohol present in the HNP-containing compositions of the present invention is typically at least 0.5 wt %, preferably from 1 wt % to 15 wt %, and more preferably from 1.5 wt % to 10 wt %, based on the total polymeric weight of the composition. The amount of acid polymer present in the HNP-containing compositions of the present invention is typically at least 50 wt %, preferably from 50 wt % to 99.5 wt %, and more preferably from 60 wt % to 98 wt %, based on the total polymeric weight of the composition.

The acid polymers of the present invention are generally homopolymers and copolymers of α,β-ethylenically unsaturated mono- or dicarboxylic acids, including combinations thereof. The term "copolymer," as used herein, includes polymers having two types of monomers, those having three types of monomers, and those having more than three types of monomers. Preferred α,β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

Preferred acid polymers are copolymers of a $C_3$ to $C_8$ α,β-ethylenically unsaturated mono- or dicarboxylic acid and ethylene or a $C_3$ to $C_6$ α-olefin, optionally including a softening monomer. Particularly preferred acid polymers are copolymers of ethylene and (meth) acrylic acid, preferably including a softening monomer. When a softening monomer is included, such copolymer is referred to herein as an E/X/Y-type copolymer, wherein E is ethylene, X is a $C_3$ to $C_8$ α,β-ethylenically unsaturated mono- or dicarboxylic acid, and Y is a softening monomer. The softening monomer is typically an alkyl (meth) acrylate, wherein the alkyl groups have from 1 to 8 carbon atoms. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene or $C_3$ to $C_6$ α-olefin in the acid copolymer is typically at least 15 wt %, preferably at least 25 wt %, more preferably least 40 wt %, and even more preferably at least 60 wt %, based on the total weight of the copolymer. The amount of $C_3$ to $C_8$ α,β-ethylenically unsaturated mono- or dicarboxylic acid in the acid copolymer is typically from 1 wt % to 35 wt %, preferably from 5 wt % to 30 wt %, more preferably from 5 wt % to 25 wt %, and even more preferably fom 10 wt % to 20 wt %, based on the total weight of the copolymer. The amount of optional softening comonomer in the acid copolymer is typically from 0 wt % to 50 wt %, preferably from 5 wt % to 40 wt %, more preferably from 10 wt % to 35 wt %, and even more preferably from 20 wt % to 30 wt %, based on the total weight of the copolymer.

Further examples of suitable acid polymers include Surlyn® ionomers, commercially available from DuPont; AClyn® ionomers, commercially available from Honeywell International Inc.; Iotek® ionomers, commercially available from ExxonMobil Chemical Company; and the acid copolymers described in U.S. Patent Application Publication No. 2003/0130434, the entire disclosure of which is hereby incorporated herein by reference.

The acid polymers of the present invention can be direct copolymers wherein the polymer is polymerized by adding all monomers simultaneously, as described in, for example, U.S. Pat. No. 4,351,931, the entire disclosure of which is hereby incorporated herein by reference. Ionomers can be made from direct copolymers, as described in, for example, U.S. Pat. No. 3,264,272 to Rees, the entire disclosure of which is hereby incorporated herein by reference. Alternatively, the acid polymers of the present invention can be graft copolymers wherein a monomer is grafted onto an existing polymer, as described in, for example, U.S. Patent Application Publication No. 2002/0013413, the entire disclosure of which is hereby incorporated herein by reference.

As used herein, "highly neutralized acid polymer" refers to the acid polymer after at least 70%, preferably at least 90%, more preferably at least 95%, even more preferably at least 98%, and even more preferably 100%, of the acid groups thereof are neutralized by a cation source. Neutralization can be effected prior to, during, or after combining the acid polymer(s) with the polyhydric alcohol(s). Preferably, the polyhydric alcohol is combined with an unneutralized or partially neutralized (i.e., less than 70% neutralized) acid polymer, and a cation source is subsequently added to further neutralize the acid polymer to 70% neutralization or higher.

Suitable cation sources include metal cations and salts thereof, organic amine compounds, ammonium, and combinations thereof. Preferred cation sources are metal cations and salts thereof, wherein the metal is preferably lithium, sodium, potassium, magnesium, calcium, barium, lead, tin, zinc, aluminum, manganese, nickel, chromium, copper, or a combination thereof. The amount of cation used in the HNP-containing composition is readily determined based on the desired level of neutralization.

HNP-containing compositions of the present invention typically have a flexural modulus of from 3,000 psi to 200,000 psi, preferably from 5,000 psi to 150,000 psi, more preferably from 10,000 psi to 125,000 psi, and even more preferably from 10,000 psi to 100,000 psi. The material hardness of the HNP-containing compositions is generally from 30 Shore D to 80 Shore D, preferably from 40 Shore D to 75 Shore D, and more preferably from 45 Shore D to 70 Shore D. The notched izod impact strength of the HNP-containing compositions of the present invention is generally at least 2 ft·lb/in, as measured at 23° C. according to ASTM D256.

HNP-containing compositions of the present invention may contain one or more additives in an amount of from 0 wt % to 60 wt %, based on the total weight of the composition. Suitable additives include, but are not limited to, chemical blowing and foaming agents, optical brighteners, coloring agents, fluorescent agents, whitening agents, UV absorbers, light stabilizers, defoaming agents, processing aids, mica, talc, nano-fillers, antioxidants, stabilizers, softening agents, fragrance components, plasticizers, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, clay, tungsten, tungsten carbide, silica, lead silicate, regrind (recycled material), and mixtures thereof. Suitable additives are more fully described in, for example, U.S. Patent Application Publication No. 2003/0225197, the entire disclosure of which is hereby incorporated herein by reference.

The present invention is not limited by any particular method for making the HNP-containing composition. In one embodiment, the composition is prepared by an extrusion process utilizing a melt extruder, such as a single or twin screw extruder. In a typical extruder process, the acid polymer(s), polyhydric alcohol(s), and optional additives are fed, either simultaneously or separately, into the extruder and melt blended at a temperature typically within the range of from 200° C. to 550° C. The cation source is concurrently or subsequently added to neutralize the acid polymer(s) to a desired level. The acid polymer(s) may be partially neutralized prior to contact with the cation source. In another embodiment, the composition is prepared by heating and reacting the acid polymer(s) and polyhydric alcohol in solution at a temperature above the melting point of the polymeric components.

HNP-containing compositions of the present invention can be used in a variety of applications. For example, HNP-containing compositions are suitable for use in golf equipment, including, but not limited to, golf balls, golf shoes, and golf clubs.

Golf balls of the present invention can be wound, one-piece, two-piece, or multi-layer balls, wherein at least one layer comprises an HNP-containing composition described herein. In golf balls having two or more layers which comprise an HNP-containing composition, the HNP-containing composition of one layer may be the same or a different HNP-containing composition as another layer. The layer(s) comprising the HNP-containing composition can be any one or more of a core layer, an intermediate layer, or a cover layer. In a preferred embodiment, the golf ball is a two-piece or multi-layer ball having a center formed from an HNP-containing composition described herein. Preferably, the center has a diameter of from 1.00 in to 1.63 in and an Atti compression of from 40 to 160. Preferably, the center has a surface hardness of from 20 Shore D to 70 Shore D. In another preferred embodiment, the golf ball is a multi-layer ball having an intermediate layer, such as an inner cover layer or outer core layer, disposed between a core and an outer cover layer, wherein the intermediate layer is formed from an HNP-containing composition described herein. Preferably, the intermediate layer has a material hardness of from 30 Shore D to 80 Shore D. Preferably, the intermediate layer has a thickness of from 0.020 in to 0.090 in, more preferably from 0.010 in to 0.060 in. In yet another preferred embodiment, the golf ball is a two-piece or multi-layer ball having an outer cover layer formed from an HNP-containing composition described herein.

The present invention is not limited by any particular process for forming the golf ball layer(s). It should be understood that the layer(s) can be formed by any suitable technique, including injection molding, compression molding, casting, and reaction injection molding.

Preferred golf balls of the present invention are multi-layer balls having a compression molded rubber core, at least one injection or compression molded intermediate layer which comprises an HNP-containing composition, and a cast or reaction injection molded polyurethane or polyurea outer cover layer. Light stable polyureas and polyurethanes are preferred for the outer cover layer material. Preferably, the rubber core composition comprises a base rubber, a crosslinking agent, a filler, and a co-crosslinking or initiator agent. Typical base rubber materials include natural and synthetic rubbers, including, but not limited to, polybutadiene and styrene-butadiene. The crosslinking agent typically includes a metal salt, such as a zinc salt or magnesium salt, of an acid having from 3 to 8 carbon atoms, such as (meth) acrylic acid. The initiator agent can be any known polymerization initiator which decomposes during the cure cycle, including, but not limited to, dicumyl peroxide, 1,1-di-(t-butylperoxy) 3,3,5-trimethyl cyclohexane, a-a bis-(t-butylperoxy) diisopropylbenzene, 2,5-dimethyl-2,5 di-(t-butylperoxy) hexane or di-t-butyl peroxide, and mixtures thereof. Suitable types and amounts of base rubber, crosslinking agent, filler, co-crosslinking agent, and initiator agent are more fully described in, for example, U.S. Patent Application Publication No. 2003/0144087, the entire disclosure of which is hereby incorporated herein by reference. Reference is also made to U.S. Patent Application Publication No. 2003/0144087 for various ball constructions and materials that can be used in golf ball core, intermediate, and cover layers.

Golf balls of the present invention generally have a coefficient of restitution ("COR") of at least 0.790, preferably at least 0.800, more preferably at least 0.805, and even more preferably at least 0.810, and an Atti compression of from 75 to 110, preferably from 90 to 100. As used herein, COR is defined as the ratio of the rebound velocity to the inbound velocity when balls are fired into a rigid plate. In determining COR, the inbound velocity is understood to be 125 ft/s.

Other than in the operating examples, or unless otherwise expressly specified, all of the numerical ranges, amounts, values and percentages such as those for amounts of materials, and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements. Furthermore, when numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball comprising a center and a cover, wherein the center is formed from a polymer composition, the polymer composition comprising:
   at least 50 wt %, based on the total polymeric weight of the polymer composition, of an acid polymer having acid groups, wherein at least 70% of the acid groups are neutralized; and
   at least 0.5 wt %, based on the total polymeric weight of the polymer composition, of a polyhydric alcohol selected from the group consisting of polyethylene glycol, polypropylene glycol, copolymers thereof, and blends thereof.

2. The golf ball of claim 1, wherein at least 90% of the acid groups of the acid polymer are neutralized.

3. The golf ball of claim 1, wherein at least 95% of the acid groups of the acid polymer are neutralized.

4. The golf ball of claim 1, wherein 100% of the acid groups of the acid polymer are neutralized.

5. The golf ball of claim 1, wherein the polymer composition has a notched izod impact strength of at least 2 ft·lb/in.

6. The golf ball of claim 1, wherein the polyhydric alcohol is polyethylene glycol or a copolymer thereof.

7. The golf ball of claim 1, wherein the polymer composition is substantially free of fatty acids and their salts.

8. The golf ball of claim 1, wherein the polymer composition has a melt flow index of from 1.0 g/10 min to 5.0 g/10 mm.

9. The golf ball of claim 1, wherein the polymer composition consists essentially of:
   at least 50 wt %, based on the total polymeric weight of the polymer composition, of the acid polymer;
   at least 0.5 wt %, based on the total polymeric weight of the polymer composition, of the polyhydric alcohol; and
   from 0 wt % to 60 wt %, based on the total weight of the polymer composition, of an inorganic additive.

10. The golf ball of claim 1, wherein the polymer composition has a flexural modulus of from 5,000 psi to 125,000 psi.

* * * * *